US012654588B2

(12) United States Patent
Jeoung et al.

(10) Patent No.: US 12,654,588 B2
(45) Date of Patent: Jun. 16, 2026

(54) METHOD AND APPARATUS FOR ENTERING BOOST MODE WITH PADDLES

(71) Applicants: HYUNDAI MOTOR COMPANY, Seoul (KR); KIA CORPORATION, Seoul (KR)

(72) Inventors: Dong Won Jeoung, Suwon-si (KR); Sang Mo Ha, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 544 days.

(21) Appl. No.: 17/940,302

(22) Filed: Sep. 8, 2022

(65) Prior Publication Data

US 2023/0211700 A1 Jul. 6, 2023

(30) Foreign Application Priority Data

Dec. 31, 2021 (KR) ........................ 10-2021-0194359

(51) Int. Cl.
B60L 3/00 (2019.01)
B60L 58/12 (2019.01)
(52) U.S. Cl.
CPC ............. B60L 58/12 (2019.02); B60L 3/0046 (2013.01)
(58) Field of Classification Search
CPC ............................... B60L 58/12; B60L 3/0046
USPC ........................................................ 701/22
See application file for complete search history.

(56) References Cited

U.S. PATENT DOCUMENTS

| | | | | |
|---|---|---|---|---|
| 2013/0158756 A1* | 6/2013 | Yamazaki | ............. | B60W 20/15 |
| | | | | 180/65.265 |
| 2016/0288661 A1* | 10/2016 | Kumazawa | ............... | B60L 7/14 |
| 2019/0308626 A1* | 10/2019 | Otanez | ............... | B60W 10/107 |
| 2023/0182756 A1* | 6/2023 | Ademane | ........... | B60W 50/087 |
| | | | | 701/36 |

FOREIGN PATENT DOCUMENTS

WO WO-2019125328 A2 * 6/2019 ......... B60L 15/2045

* cited by examiner

*Primary Examiner* — Helal A Algahaim
*Assistant Examiner* — Michael T Dowling
(74) *Attorney, Agent, or Firm* — Morgan Lewis & Bockius LLP

(57) ABSTRACT

A method and apparatus of entering boost mode with paddles, which is capable of ensuring stability of driving by switching driving modes while minimizing movement of a driver's gaze and hand, includes determining whether to instruct to enter a boost mode based on a sensing value of an accelerator pedal position sensor and an input of a paddle, determining whether a current state of a vehicle is able to enter the boost mode when it is determined to instruct to enter the boost mode, switching, by the controller, a current mode of the vehicle to the boost mode when the controller concludes that the current state of the vehicle is able to enter the boost mode, and determining whether to instruct to release the boost mode based on the sensing value of the accelerator pedal position sensor and the input of the paddle.

19 Claims, 4 Drawing Sheets

METHOD AND APPARATUS FOR ENTERING BOOST MODE WITH PADDLES

CROSS-REFERENCE TO RELATED APPLICATION

The present application claims priority to Korean Patent Application No. 10-2021-0194359, filed on Dec. 31, 2021, the entire contents of which is incorporated herein for all purposes by this reference.

BACKGROUND OF THE PRESENT DISCLOSURE

Field of the Present Disclosure

The present disclosure relates to a method of entering boost mode, and to a method and apparatus of entering boost mode with paddles, which enable an electric vehicle to enter a boost mode using a paddle to ensure instantaneous acceleration.

Description of Related Art

A driver of a vehicle will accelerate or decelerate the vehicle depending on the strength and time of pressing an accelerator pedal, which is the same for electric vehicles. The driving mode of the electric vehicle may be classified into fuel economy, normal, and high-performance modes. A driver may switch driving modes by operating a center fascia panel or by operating a button near a steering wheel or a shift lever.

Paddles are typically provided on the rear of a steering wheel, and have different purposes of use depending on the type of vehicle. For example, a paddle in an internal combustion engine vehicle may control gear shifting to ensure acceleration/braking force according to the driver's intention, and a paddle in an electric vehicle may adjust regenerative braking to ensure instantaneous braking force on the one hand and to effectively manage an SOC on the other hand. In a hybrid vehicle, the normal and sports modes thereof may correspond to those of the internal combustion engine vehicle, and the hybrid economical mode thereof may correspond to that of the electric vehicle.

Each manufacturer performs a change in driving mode to ensure rapid acceleration by a center fascia panel, a button near a shift lever, or a button attached to a steering wheel.

As described above, for the driver to perform rapid acceleration while driving, the driver may press the accelerator pedal hard for a long time or switch the driving mode to generate more torque compared to the equivalent pedal input or change motor control to release a limitation of limit torque. Here, the rapid acceleration may refer to instantaneous acceleration due to an increase in speed limit at low speed or a rapid change in speed in a passing situation. However, the above method reveals the following limitations.

When attempting to change the speed using the pedal, in a fuel economy/normal mode, the driver repeatedly presses the accelerator pedal a lot, which may lead to the reaction of the pedal's repulsive force causing fatigue to the driver. On the other hand, in a high-performance mode, the driver presses the accelerator pedal, which generates a large amount of torque even when the amount of pressure applied to the accelerator pedal is small, making it difficult for the driver to adjust the desired acceleration thereof.

Furthermore, when attempting to change the speed by switching the driving mode, the driver must move his or her gaze toward a button and must move his or her hand from the steering wheel to the button to operate the button, causing a deterioration in stability of driving because the concentration of driving at the moment of switching the driving mode is lower than usual.

The driving mode does not automatically return to the previous state after it is switched to the high-performance mode. Accordingly, torque is continuously generated as long as the driver does not return the driving mode by operating it, which causes a deterioration in fuel efficiency. Furthermore, when the limitation of limit torque is continuously released, a lot of heat is generated in the motor, which may adversely affect the durability of the motor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of entering boost mode with paddles that substantially obviate one or more problems due to limitations and disadvantages of the related art.

Various aspects of the present disclosure are directed to providing a method of entering boost mode with paddles, which is configured for ensuring stability of driving by switching driving modes while minimizing movement of a driver's gaze and hand.

Various aspects of the present disclosure are directed to providing an apparatus of entering boost mode with paddles, which is configured for ensuring stability of driving by switching driving modes while minimizing movement of a driver's gaze and hand.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the present disclosure, as embodied and broadly described herein, there is provided a method of entering boost mode with paddles, which includes determining whether to instruct to enter a boost mode based on a sensing value of an accelerator pedal position sensor and an input of a paddle, determining whether a current state of a vehicle is able to enter the boost mode when it is determined to instruct to enter the boost mode, switching, by the controller, a current mode of the vehicle to the boost mode when the controller concludes that the current state of the vehicle is able to enter the boost mode, and determining whether to instruct to release the boost mode based on the sensing value of the accelerator pedal position sensor and the input of the paddle.

In another aspect of the present disclosure, there is provided an apparatus of entering boost mode with paddles, which includes an accelerator pedal position sensor configured to output a sensing value corresponding to an accelerator pedal pressed by a driver, a paddle including at least one of an upshift paddle and a downshift paddle, and a controller configured to use the sensing value received from the accelerator pedal position sensor and shift paddle input information received from the paddle to perform first determination of whether the driver instructs a vehicle to drive in a boost mode, to use a battery's state of charge, a battery temperature, a motor temperature, and a transmission temperature to perform second determination of whether the vehicle is able to drive in the boost mode, to control an operation of a motor in response to the results of the two determinations, and to display whether to switch to the boost mode on a cluster.

The present disclosure is not limited to the above-mentioned objects, and other objects of the present disclosure may be clearly understood by those skilled in the art to which an exemplary embodiment of the present disclosure pertains from the following description.

It is to be understood that both the foregoing general description and the following detailed description of the present disclosure are exemplary and explanatory and are intended to provide further explanation of the present disclosure as claimed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
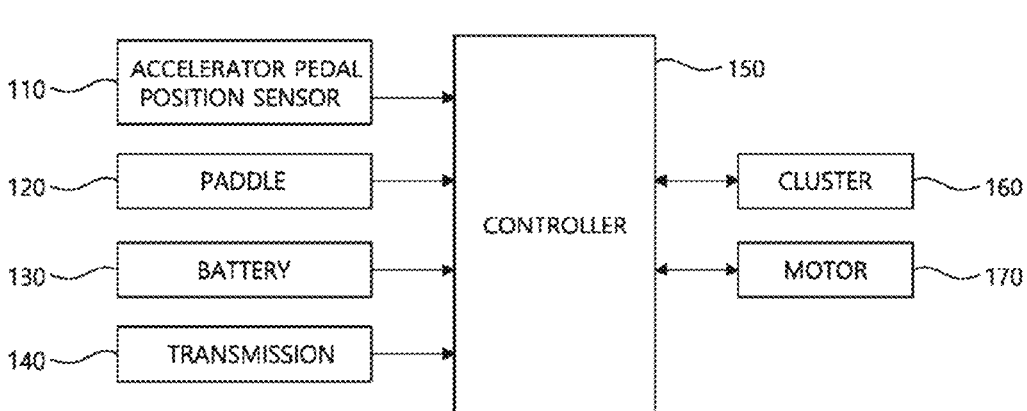
FIG. 1 illustrates an exemplary embodiment of an apparatus of entering boost mode with paddles according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the present disclosure, the operational advantages of the present disclosure, and the objects achieved by the practice of the present disclosure, reference should be made to the accompanying drawings for illustrating exemplary embodiments of the present disclosure and the contents described in the accompanying drawings.

Hereinafter exemplary embodiments of the present disclosure will be described in detail with reference to the accompanying drawings. Throughout the present disclosure, like reference numerals refer to like elements.

FIG. 1 illustrates an exemplary embodiment of an apparatus of entering boost mode with paddles according to an exemplary embodiment of the present disclosure.

Referring to FIG. 1, the apparatus of entering boost mode with paddles, which is designated by reference numeral 100, includes an accelerator pedal position sensor (APS) 110, a paddle shift (hereinafter, referred to as a "paddle") 120, a battery 130, a transmission 140, a controller 150, a cluster 160, and a motor 170.

The boost mode as used herein corresponds to a high-performance mode, which may also be referred to as a rapid acceleration mode, among fuel economy, normal, and high-performance modes as the driving modes of an electric vehicle.

The accelerator pedal position sensor (APS) 110 transmits a sensing value corresponding to an accelerator pedal pressed by a driver to the controller 150.

The paddle 120 is a type of shift lever in an automatic transmission or an automated manual transmission, which is mainly mounted for the convenience of shifting during sports driving. The paddle is mainly mounted near a steering wheel, and may be divided into a downshift paddle marked with "−" and an upshift paddle marked with "+". In general, paddles provided in hybrid and electric vehicles often function to control the step of regenerative braking. An input applied by a driver to the downshift paddle or the upshift paddle is transmitted to the controller 150.

The battery 130 is configured to supply driving energy of the vehicle, and information on a state of charge (SOC) and a current temperature of the battery 130 is transmitted to the controller 150.

The transmission 140 converts power generated by various engines into rotation force required for speed and performs the transmission thereof, and temperature information of the transmission 140 is transmitted to the controller 150.

The controller 150 utilizes the sensing value received from the accelerator pedal position sensor 110, the shift input received from the paddle 120, the SOC and the temperature received from the battery 130, and the temperature received from the transmission 140, to control the operation of the motor 170 in response to a result of determining whether the driver of the vehicle instructs to drive in the boost mode and to display whether the normal driving mode is switched to the boost mode on the cluster 160.

In an exemplary embodiment of the present invention, the shift input received from the paddle 120, the SOC and the temperature received from the battery 130, and the temperature received from the transmission 140 are detected by corresponding sensors.

Figure 2:
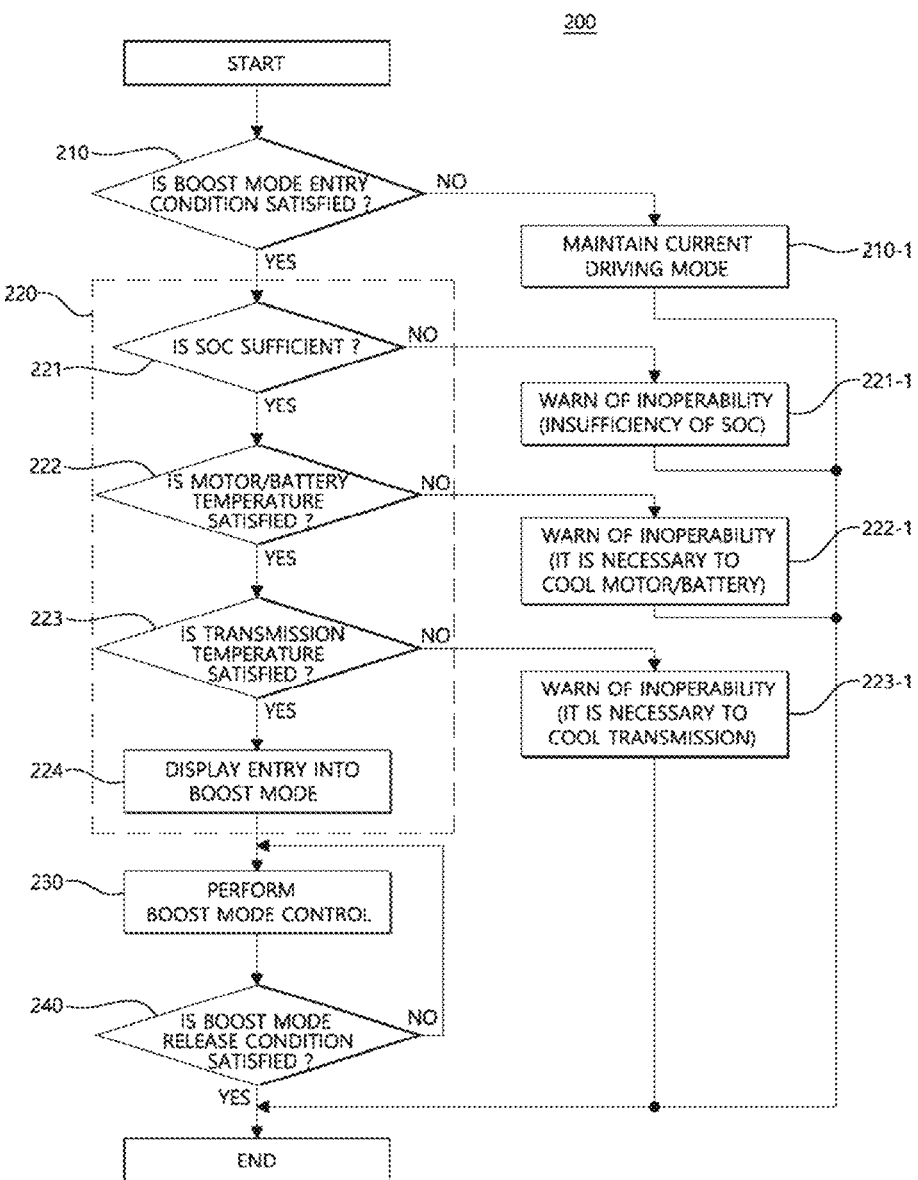
FIG. 2 illustrates an exemplary embodiment of a method of entering boost mode with paddles according to an exemplary embodiment of the present disclosure.

FIG. 2 illustrates an exemplary embodiment of a method of entering boost mode with paddles by the controller 150 according to an exemplary embodiment of the present disclosure.

Referring to FIG. 2, the method of entering boost mode with paddles, which is designated by reference numeral 200, includes a step of determining whether a driver instructs to enter a boost mode (210), a step of determining whether a vehicle enters the boost mode (220), a step of driving the vehicle in the boost mode (230), and a step of determining whether to satisfy a boost mode release condition (240).

In the step of determining whether a driver instructs to enter a boost mode (210), it is determined whether the driver instructs the vehicle to enter the boost mode. For example, it is determined whether a driver's specific action satisfies a preset boost mode entry condition. Here, the driver's specific action refers to an operation of pressing an accelerator pedal and an operation of input to a paddle 120. The preset boost mode entry condition is a condition in which a sensing value output from an accelerator pedal position sensor 110 is greater than a comparison criterion and there is an input from the paddle at a same time.

The sensing value of the accelerator pedal position sensor 110 is a value determined depending on whether the driver presses the accelerator pedal, which may be adjusted in consideration of the characteristics of the vehicle. For convenience of description, it is assumed hereinafter that a preset comparison criterion for comparison with the sensing value is 0%. That is, when the sensing value of the accelerator pedal position sensor 110 is 0% or more, one of the boost mode entry conditions may be satisfied. The vehicle typically includes two paddles, namely, a paddle marked with "+" and a paddle marked with "−". Unless otherwise noted, the paddle 120 in the following description refers to a paddle marked with "+". Accordingly, when the driver wants to instruct the vehicle to switch to the boost mode, the driver must press the accelerator pedal so that the sensing value of the accelerator pedal position sensor 110 is 0% or more while applying an input to the paddle 120.

The present disclosure is directed to providing to differently control the boost mode according to the input time applied to the paddle 120. For example, when the paddle 120 is input for only a short time, the vehicle is operated in a linear boost mode where the torque is gradually increased in a linear or stepwise manner. When the paddle 120 is input for more than a predetermined limit time, the vehicle is operated in a maximum boost mode where the maximum torque is applied instantaneously. Alternatively, it is possible to set the vehicle to operate in an exponential boost mode where the torque is increased exponentially according to the time period for which an input is applied to the paddle 120. Even when the input time period applied to the paddle is shorter than a predetermined time so that the vehicle is under regenerative braking, this will not cause any problems with the vehicle's operation because it is also a favorable condition for acceleration.

In the step of determining whether a driver instructs to enter a boost mode (210), when it is determined that the driver's specific action is not an instruction to enter the boost mode (No in step 210), the current driving mode is maintained as it is (210-1). When it is determined that the driver's specific action is an instruction to enter the boost mode (Yes in step 210), the step of determining whether a vehicle enters the boost mode (220), which will be described later, is performed.

In the step of determining whether a vehicle enters the boost mode (220), the boost mode entry is permitted only when the state of charge (SOC) value of the battery is sufficient and the temperature of the motor 150/battery 130/transmission 140 is less than or equal to a limit temperature. To the present end, the above step (220) includes a step of determining whether the SOC is sufficient (221), a step of determining whether the temperature of the motor/battery is less than or equal to the limit temperature (222), a step of determining whether the temperature of the transmission is less than or equal to the limit temperature (223), and a cluster display step (224).

In the step of determining whether the SOC is sufficient (221), it is determined whether the low-voltage battery is overdischarged when the vehicle is driven in the boost mode in view of the SOC value of the battery 130. When it is expected that the battery is overdischarged and the SOC is insufficient if the boost mode is applied (No in step 221), the driver is notified that the boost mode is not applicable due to insufficiency of the SOC (221-1). There are various methods of notifying the driver. For example, it is possible to utilize a text or a warning light through a cluster 160 provided inside the vehicle, and the same applies in the following description. In the step of determining whether the SOC is sufficient (221), when it is determined that the SOC value of the battery is sufficient (Yes in step 221), the step of determining whether the temperature of the motor/battery is less than or equal to the limit temperature (222), which will be described later, is performed.

In an exemplary embodiment of the present invention, the SOC is determined to be sufficient if the current SOC is greater than a predetermined SOC.

In the step of determining whether the temperature of the motor/battery is less than or equal to the limit temperature (222), the temperature of the motor 170/battery 130 is compared with a preset limit temperature. When the temperature of the motor/battery is equal to or greater than the preset limit temperature (No in step 222), the driver is notified that the boost mode is not applicable because it is necessary to cool the motor/battery due to the high temperature thereof (222-1). In the step of determining whether the temperature of the motor/battery is less than or equal to the limit temperature (222), when the temperature of the motor/battery is less than or equal to the preset limit temperature (Yes in step 222), the step of determining whether the temperature of the transmission is less than or equal to the limit temperature (223), which will be described later, is performed. The limit temperatures of the motor 170 and the battery 130 may be defined as a first limit temperature and a second limit temperature, for example.

In the step of determining whether the temperature of the transmission is less than or equal to the limit temperature (223), the temperature of the transmission is compared with a preset limit temperature. When the temperature of the transmission is equal to or greater than the preset limit temperature (third limit temperature) (No in step 223), the driver is notified that the boost mode is not applicable because it is necessary to cool the transmission due to the high temperature thereof (223-1). In the step of determining whether the temperature of the transmission is less than or equal to the third limit temperature (223), when the temperature of the transmission is less than or equal to the preset limit temperature (Yes in step 223), the cluster display step (224), which will be described later, is performed.

In the above description, the first, second, and third limit temperatures may be determined in various ways. Accordingly, these are not limited to particular temperatures herein.

In the cluster display step (224), at least one of information on whether to enter the boost mode and boost mode

7 | 8 level information for each driving is displayed on the cluster 160. By displaying the information on whether to enter the boost mode and the boost mode level information on the cluster, the driver while driving may recognize that the vehicle is in the boost mode. By displaying and differentiating regenerative braking, it is possible to minimize discomfort to the driver.

In an exemplary embodiment of the present invention, the order of the steps 221, 222, 223 is exemplary and may occur in different order by combination of steps 221, 222 and 223.

Figure 3:
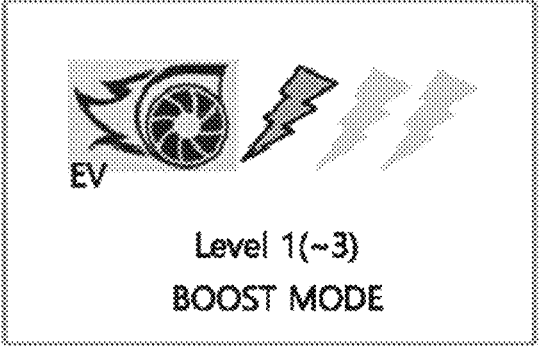
FIG. 3 illustrates an example of a boost mode icon.

FIG. 3 illustrates an example of a boost mode icon.

The boost mode level is determined according to the input applied to the two paddles (+, –). The amount of generated torque is obtained by adding boost torque to an amount of torque corresponding to the accelerator pedal position sensor for each driving mode. Because there are different surplus torques for each driving mode, it is preferable to display a boostable torque level for each driving mode.

After the cluster display step (224) is performed, the step of driving the vehicle in the boost mode (230), which will be described later, is performed.

In the step of driving the vehicle in the boost mode (230), the vehicle is operated to drive in the boost mode. Here, the operation is not performed manually by the driver, but is performed by the controller of the vehicle to control the vehicle to operate in the boost mode. As described above, the boost mode may be changed linearly or exponentially depending on how the driver applies an input to the paddle.

When the driver applies an input to the paddle during operation in the boost mode, the amount of boost may be increased, decreased, or converted to the maximum boost mode in response to the input applied to the paddle. For example, when the driver applies a short input to the "+" paddle for less than a predetermined time period, the amount of boost is increased linearly or exponentially. Conversely, when the driver applies a short input to the "–" paddle for less than a predetermined time period, the amount of boost is decreased linearly or exponentially. It is also possible to force the vehicle to enter the maximum boost mode when an input is applied to the "+" paddle for more than a predetermined time period.

In the step of determining whether to satisfy a boost mode release condition (240), it is determined whether the driver instructs the vehicle driven in the boost mode to release the boost mode. When it is determined that the driver's specific action instructs to release the boost mode (Yes in step 240), the boost mode is released (250-1). On the other hand, when it is determined that there is no driver's specific action instructing the release of the boost mode (No in step 240), the step of determining whether to satisfy a boost mode release condition (240) is continuously performed.

The boost release condition may be set, for example, when the output of the accelerator pedal position sensor is less than or equal to 0% as the driver performs a specific action, or when an input is applied to the "–" paddle for more than a predetermined time period.

When the current driving mode is maintained as it is (210-1), when the driver is notified that the boost mode is not applicable (221-1, 222-1, and 223-1), and when the boost mode is released (250-1), the method of entering boost mode with paddles 200 is terminated, but an exemplary embodiment in which the step of determining whether a driver instructs to enter a boost mode (210) is performed is also possible.

In the above description, whether to enter the rapid acceleration mode, the addition of the amount of generated torque, and the adjustment of the amount of additional torque through the paddle may be displayed on the cluster when entering the rapid acceleration mode.

Figure 4:
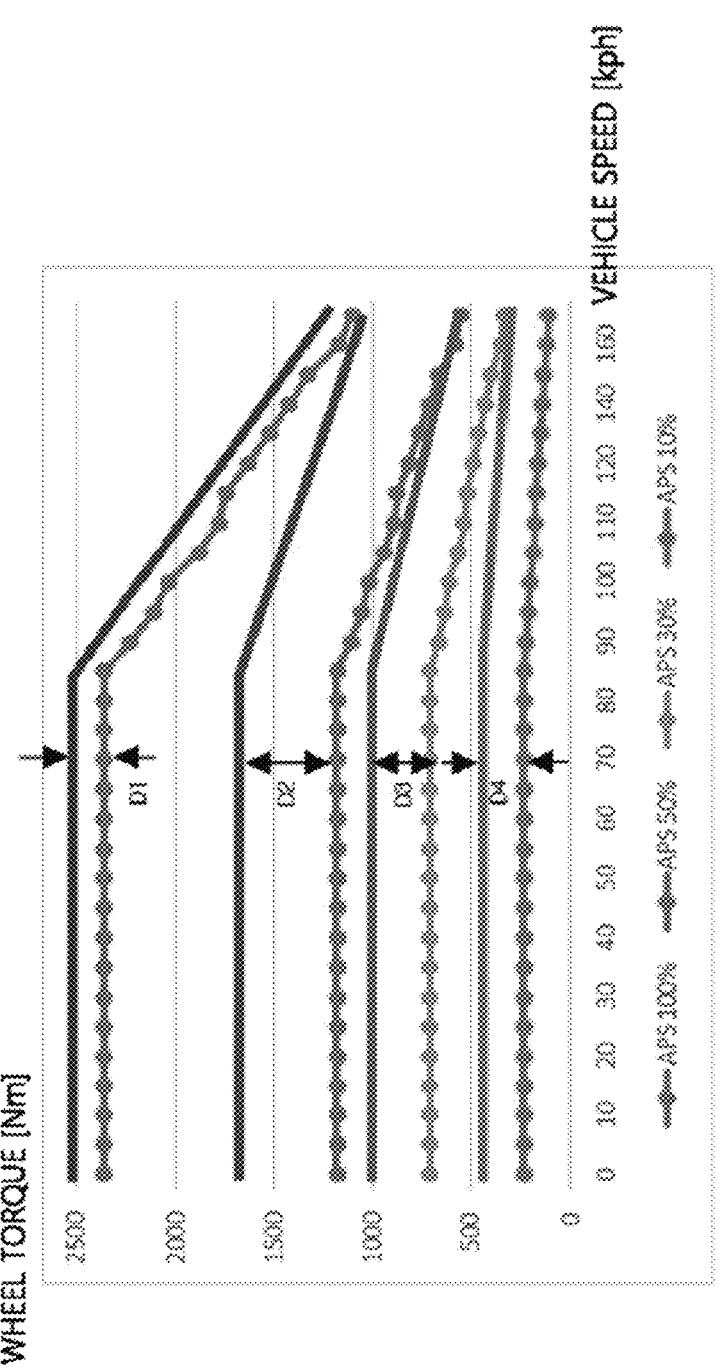
FIG. 4 illustrates an example of a motor torque map according to an acceleration level setting.

FIG. 4 illustrates an example of a motor torque map according to an acceleration level setting.

Referring to FIG. 4, the magnitude of the wheel torque is the largest when the value of the accelerator pedal position sensor (APS) is 100% and the smallest when the value of the accelerator pedal position sensor is 10%. The magnitude of the wheel torque remains the same until the vehicle speed is about 85 to 90 kilometer per hour (KPH), but decreases when the speed exceeds it. Considering the characteristics of the motor, it is desirable to fix the wheel torque to 2500 Nm when the accelerator pedal position sensor is 100%. Comparing the reference torque of each accelerator pedal position sensor and the torque of the actual vehicle illustrated immediately below, it may be seen that the surplus torque is the lowest D1 when the accelerator pedal position sensor is 100%, and is larger in the order of D4 when the accelerator pedal position sensor is 10%, D3 when the accelerator pedal position sensor is 30%, and D2 when the accelerator pedal position sensor is 50%.

As is apparent from the above description, the method and apparatus of entering boost mode with paddles according to an exemplary embodiment of the present disclosure enable a stable and convenient entry into the boost mode compared to the existing method of switching driving modes (using button or cluster), improving driver convenience by easily ensuring and manipulating acceleration compared to the existing method under the condition of driver use. Furthermore, the present disclosure is advantageous in terms of fuel efficiency and durability because it is convenient to enter/release the high-performance mode compared to the existing method of switching driving modes. Moreover, the present disclosure has an advantage that horizontal deployment is possible without the increase in cost because it is implemented by adding S/W logic without the addition of separate parts and the utilization of space. Furthermore, the present disclosure may be actively utilized for high-performance electric vehicles and low-cost electric vehicles by new function of improving drivability in terms of marketability.

The present disclosure is not limited to the above-mentioned effects, and other effects of the present disclosure may be clearly understood by those skilled in the art to which an exemplary embodiment of the present disclosure pertains from the above description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of entering a boost mode with paddles, the method comprising:
    determining, by a controller, whether to instruct to enter the boost mode based on a sensing value of an accelerator pedal position sensor and an input of a steering-wheel-mounted paddle that is manually actuated independently of an accelerator pedal;
    determining, by the controller, whether a current state of a vehicle is able to enter the boost mode when the controller concludes to instruct to enter the boost mode;
    switching, by the controller, a current mode of the vehicle to the boost mode when the controller concludes that the current state of the vehicle is able to enter the boost mode; and
    determining, by the controller, whether to instruct to release the boost mode based on the sensing value of the accelerator pedal position sensor and the input of the steering-wheel-mounted paddle that is manually actuated independently of the accelerator pedal,
    wherein, in the switching to the boost mode, a torque of the vehicle increases in different forms in response to an input duration applied to the paddle, the paddle serving as a time-variable manual input dedicated for boost-mode torque control, and the paddle is an upshift paddle dedicated for boost control.

2. The method of claim 1, wherein the determining whether to instruct to enter a boost mode includes:
    comparing the sensing value of the accelerator pedal position sensor with a preset comparison criterion; and
    determining whether the input is applied to the steering-wheel-mounted paddle that is manually actuated independently of the accelerator pedal,
    wherein, when the controller determines that the sensing value of the accelerator pedal position sensor is greater than the comparison criterion and the input is applied to the paddle, the controller concludes that the driver instructs the vehicle to enter the boost mode.

3. The method of claim 1, wherein the current state of the vehicle is at least one of a battery's state of charge, a motor temperature, a battery temperature, and a transmission temperature.

4. The method of claim 3, wherein the determining whether a current state of a vehicle is able to enter the boost mode includes:
    determining whether the battery's state of charge (SOC) is equal to or more than a predetermined SOC value to allow the vehicle to enter the boost mode;
    comparing the motor temperature with a first limit temperature;
    comparing the battery temperature with a second limit temperature; and
    comparing the transmission temperature with a third limit temperature.

5. The method of claim 4, wherein in the determining whether a current state of a vehicle is able to enter the boost mode:
    when the battery's state of charge is equal to or more than the predetermined SOC value, the motor temperature is lower than the first limit temperature, the battery temperature is lower than the second limit temperature, and the transmission temperature is lower than the third limit temperature, the controller concludes that the current state of the vehicle is able to enter the boost mode; and
    when the battery's state of charge is less than the predetermined SOC value, the motor temperature is higher than the first limit temperature, the battery temperature is higher than the second limit temperature, and the transmission temperature is higher than the third limit temperature, the controller concludes that the current state of the vehicle is not able to enter the boost mode.

6. The method of claim 5, wherein the determining whether a current state of a vehicle is able to enter the boost mode further includes:

when the controller concludes that the current state of the vehicle is not able to enter the boost mode, displaying whether the vehicle enters the boost mode and boost mode level information.

7. The method of claim 6, wherein the displaying whether the vehicle enters the boost mode and boost mode level information further includes displaying a boostable torque level for each driving mode in each driving mode of the vehicle.

8. The method of claim 1, wherein, when the steering-wheel-mounted paddle that is manually actuated independently of the accelerator pedal is input for less than a predetermined time period, the vehicle is operated in a linear boost mode where the torque is increased linearly or step-wisely according to a time.

9. The method of claim 8, wherein, when the steering-wheel-mounted paddle that is manually actuated independently of the accelerator pedal is input for more than or equal to the predetermined time period, the vehicle is operated in a maximum boost mode where a maximum torque is applied.

10. The method of claim 1, wherein, when the input is applied to the steering-wheel-mounted paddle that is manually actuated independently of the accelerator pedal, the vehicle is operated in an exponential boost mode where the torque is increased exponentially according to a time period input by the paddle.

11. The method of claim 1, wherein the determining whether to instruct to release the boost mode includes:

comparing the sensing value of the accelerator pedal position sensor with a preset comparison criterion; and determining whether the input is applied to the paddle, wherein, when the controller determines that the sensing value of the accelerator pedal position sensor is lower than the comparison criterion and the input is applied to the steering-wheel-mounted paddle that is manually actuated independently of the accelerator pedal, the controller concludes that the driver instructs the vehicle to release the boost mode, and wherein the paddle is a downshift paddle.

12. The method of claim 11, wherein, when it is determined that the input is applied to the paddle, the input is applied to the downshift paddle for more than a predetermined time period.

13. The method of claim 11, wherein, when the controller concludes that the driver instructs the vehicle to release the boost mode, the controller is configured to switch a driving mode of the vehicle from the boost mode to a normal mode.

14. An apparatus of entering a boost mode with paddles, the apparatus comprising:

an accelerator pedal position sensor configured to output a sensing value corresponding to an accelerator pedal pressed by a driver;

a paddle including at least one of an upshift paddle and a downshift paddle, the paddle being mounted near a steering wheel and configured to receive an input independently of the accelerator pedal; and a controller electrically connected to the accelerator pedal position sensor and the steering-wheel-mounted paddle and configured to use the sensing value received from the accelerator pedal position sensor and shift paddle input information received from the steering-wheel-mounted paddle to perform first determination of whether the driver instructs a vehicle to drive in a boost mode, to use a battery's state of charge, a battery temperature, a motor temperature, and a transmission temperature to perform second determination of whether the vehicle is able to drive in the boost mode, to control an operation of a motor in response to results of the first determination and the second determination, to display whether to switch a current mode of the vehicle to the boost mode on a cluster, and to control a torque increase in the boost mode in different forms according to an input duration applied to the steering-wheel-mounted paddle, the paddle serving as a time-variable manual input dedicated for boost-mode torque control.

15. The apparatus of claim 14, wherein the controller is configured to conclude that the driver instructs to drive in the boost mode when the controller determines that the sensing value of the accelerator pedal position sensor is greater than a preset comparison criterion and the driver applies an input to the steering-wheel-mounted upshift paddle.

16. The apparatus of claim 14, wherein the controller is configured to conclude that the vehicle is able to be driven in the boost mode when the battery's state of charge (SOC) is equal to or more than a predetermined SOC value to drive the vehicle in the boost mode, the motor temperature is lower than a first limit temperature, the battery temperature is lower than a second limit temperature, and the transmission temperature is lower than a third limit temperature.

17. The apparatus of claim 14, wherein the controller is configured to cause the torque of the vehicle to increase in different forms in response to the input time applied to the steering-wheel-mounted paddle when the vehicle is driven in the boost mode.

18. The apparatus of claim 17, wherein:

when the steering-wheel-mounted paddle is input for less than a predetermined time period, the vehicle is operated in a linear boost mode where the torque is increased in a linearly or stepwisely according to a time, and when the steering-wheel-mounted paddle is input for more than or equal to the predetermined time period, the vehicle is operated in a maximum boost mode where a maximum torque is applied, or when an input is applied to the steering-wheel-mounted paddle, the vehicle is operated in an exponential boost mode where the torque is increased exponentially according to a time period input by the paddle.

19. The apparatus of claim 14, wherein, when the controller determines that the sensing value of the accelerator pedal position sensor is lower than a comparison criterion or an input is applied to the steering-wheel-mounted downshift paddle forming the paddle for more than a predetermined time period while the vehicle is driven in the boost mode, the controller is configured to conclude that the driver instructs the vehicle to release the boost mode so that the driving mode is switched to a normal mode.

* * * * *